Figure 3:
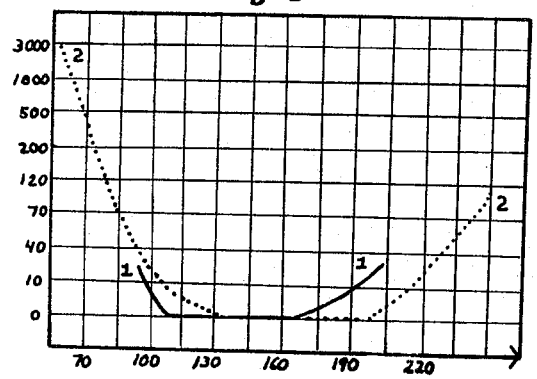

March 7, 1967     H. W. FLEMING     3,308,180
SELECTIVE HYDROGENATION
Filed April 27, 1964     2 Sheets-Sheet 1
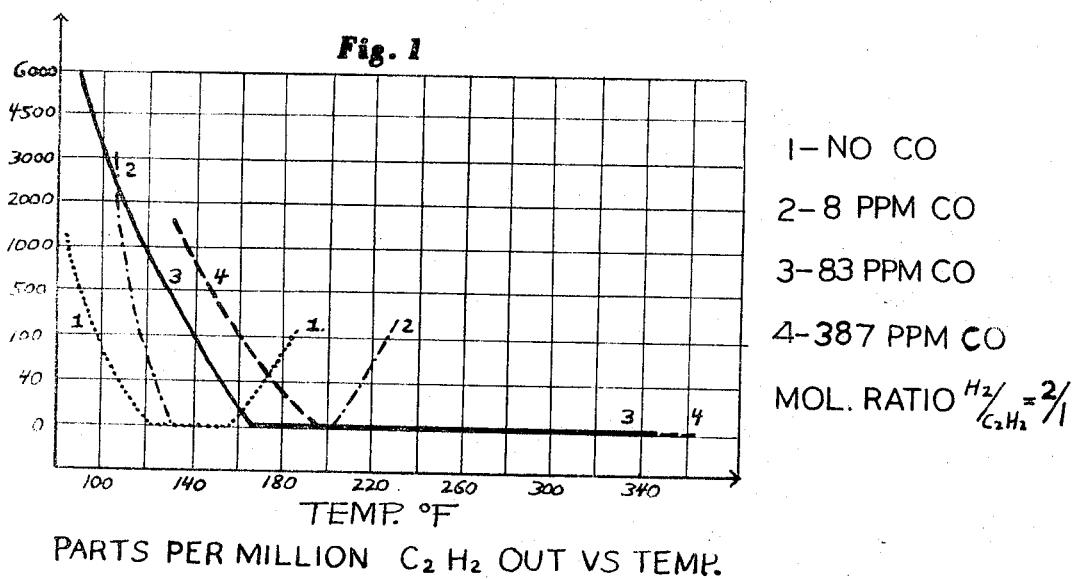
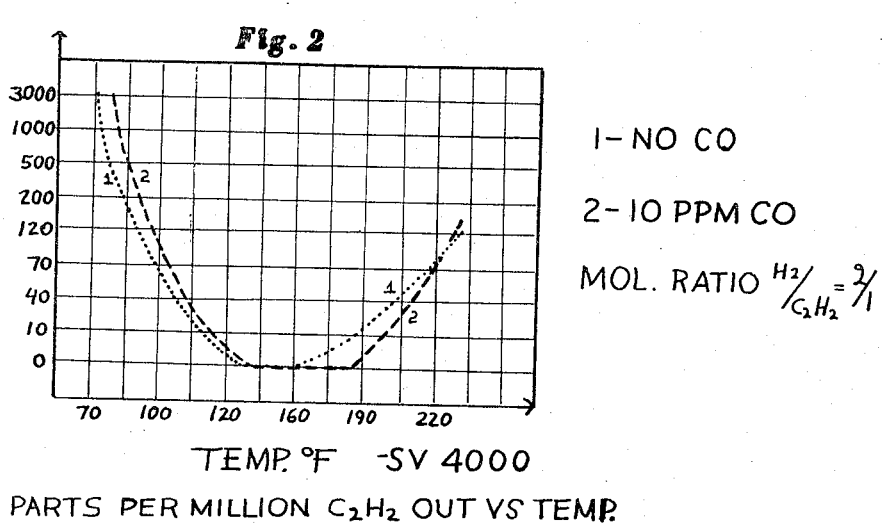
INVENTOR.
HAROLD W. FLEMING
BY Norman L. Wilson Jr.

1 — NO CO
2 — 10 PPM CO
MOL. RATIO $H_2/C_2H_2 = 2/1$

TEMP. °F  —SV 2000
PARTS PER MILLION $C_2H_2$ OUT VS TEMP.

2% $H_2$
1% $C_2H_2$
300 PSIG

1 — 10 PPM CO
2 — 20 PPM CO
3 — 98 PPM CO
MOL. RATIO $H_2/C_2H_2 = 2/1$

TEMP. °F  —SV 4000
PARTS PER MILLION $C_2H_2$ OUT VS TEMP.

INVENTOR.
HAROLD W. FLEMING
BY *Norman R. Wilson Jr.*

United States Patent Office 3,308,180
Patented Mar. 7, 1967

3,308,180
SELECTIVE HYDROGENATION
Harold W. Fleming, Louisville, Ky., assignor to Catalysts and Chemicals, Inc., a corporation of Delaware
Filed Apr. 27, 1964, Ser. No. 362,635
5 Claims. (Cl. 260—677)

This invention relates to selective hydrogenation, and more particularly to the hydrogenation of acetylene. In one of its aspects the invention pertains to acetylene removal from ethylene-containing streams by selective hydrogenation.

Olefin polymers now account for a significant portion of the plastics business. Of these olefin polymers, the use of polyethylene is substantial indeed, especially in bags, containers, paper coatings, filaments and films. Accordingly most ethylene plants in operation are interested in making polyethylene grade ethylene. A chief source of ethylene is the $C_2$ fraction from pyrolysis or catalytic cracking of refinery gas, ethane, propane, butane naphthas and the like. However, as disclosed in U.S. 2,946,829 to Likens et al. ethylene for the production of polyethylene should not contain more than 25 parts per million of such impurities as acetylene. Generally only 10 parts per million acetylene are now tolerated in ethylene streams. The presence of acetylene in polymer-grade monomers affects both the life of the polymerization catalyst and the quality of the polyethylene polymer produced. This means that a separation must be made between ethylene and acetylene. Hence with the continued growth of the polyethylene industry a need for improved methods for purifying $C_2$ streams, particularly for separating ethylene and acetylene are in demand.

Likens et al. point out that selective hydrogenation of of acetylene, leaving ethylene, poses a difficult problem when only small amounts of acetylene are present. According to Likens et al. a catalyst suitable for the purpose is made by spraying palladium onto the surface of an alumina carrier possessing a pore volume between 0.0 and 0.4 cc. per gram at a threshold diameter of 800 A. The catalyst contains 0.01 to 0.09 per cent by weight palladium metal concentrated near the surface.

Another palladium catalyst also for the selective hydrogenation of acetylenes from olefins is a low area catalyst described in U.S. 3,113,980 to Robinson. The palladium (0.01 to 0.4 weight percent) is supported on alumina whose pores have a mean radius of 200 to 1400 A. and which has a surface area of 32 to 5 square meters per gram. While acetylene hydrogenation is selective, temperature control in the case of these palladium catalysts is very critical as described in the Robinson history. In addition high area palladium catalysts have not been found effective. Thus, while palladium catalysts have been known since 1954, as shown in U.S. 2,802,889, hydrogenation results have not been completely satisfactory. This is especially true of the tail gas streams containing 10 to 25 parts per million of acetylene resulting from the fractionation of the $C_2$ gas stream in ethylene production.

On the basis of the prior art it is seen that the selectivity of palladium catalysts in the hydrogenation of small amounts of acetylene in ethylene streams is largely determined by catalyst pore volume and surface area, and by temperature control. In accordance with this invention a process is provided for selectively hydrogenating acetylene present in small amounts in gas streams containing $C_2$ and $C_3$ olefins which, under a given set of conditions, permits the hydrogenation at a very low acetylene leakage over a wider temperature range than heretofore. In addition by the practice of this invention an activated alumina support for palladium can be used even with surface areas and pore sizes beyond those which are encompassed by Likens et al. and Robinson.

The selective hydrogenation of acetylene from an ethylene stream using palladium supported on activated alumina is acknowledged. To catalyze predominantly the hydrogenation of acetylenes, temperatures of 100° F. to 400° F., pressures of 15 to 1000 pounds per square inch gauge, and space velocities of 500 to 7000 volumes of gas per volume of catalyst per hour and higher are employed. Further, the presence of hydrogen both in stoichiometric proportion and in large excess with respect to acetylene is exemplified by the prior art. It is within this framework, and to an even broader range of catalysts, that this invention applies.

According to the practice of one embodiment of this invention a process for selectively hydrogenating acetylene present in a $C_2$ olefin stream is provided by contacting the gas stream, under hydrogenation conditions as set forth hereinbefore, in admixture with 1.5 to 5 mols hydrogen per mol acetylene, with a palladium catalyst rendered more selective for acetylene than ethylene over a wider temperature range than heretofore by carbon monoxide in said gas mixture during the hydrogenation. The quantity of carbon monoxide generally is in the range of 5 to 400 parts per million based on the ethylene stream. More than 400 parts per million can be used but there is no particular advantage to such use since it will usually be separated after hydrogenation. The invention pertains to the separation of acetylene from an ethylene stream containing 0.5 to 1 percent acetylene by selective hydrogenation by contacting the gas under hydrogenation conditions with about 2 mols of hydrogen per mol of acetylene in the gas, over a palladium catalyst deliberately being poisoned during the hydrogenation, and being thereby rendered more selective for acetylene than ethylene over a wider temperature range, by 10 to 100 parts per million carbon monoxide based on the ethylene stream. The catalyst contains 0.01 to 0.1 weight percent palladium, preferably 0.01 to 0.05 percent, supported on activated alumina.

The alumina used as a support for the palladium is obtained from any of the known sources of activated alumina. It is either purchased or synthesized from sodium aluminate as a trihydrate containing various amounts of gibbsite, randomite and bayerite. Gamma alumina is, of course, preferred, and as indicated, a high surface area alumina, not generally used in selective hydrogenation of ethylene, can be used as well as a low surface area. By a high surface area alumina is meant a form of alumina having an area of 150 square meters per gram and higher, especially 300 square meters per gram, a low surface area being one below 100 square meters per gram, especially 1 to 50 square meters per gram.

In carrying out this invention the carbon monoxide in the desired amount can be added to the ethylene gas stream, to the hydrogen gas stream, or separately to the reactor. The carbon monoxide can also be passed over the catalyst immediately prior to the hydrogenation. However this method is not as effective. In one aspect the invention contemplates operating the shift converter in a hydrogen plant under conditions giving a hydrogen stream of desired carbon monoxide content. A methanation step would thus be eliminated in hydrogen production.

The advantages of employing a palladium catalyst rendered more selective for acetylene than ethylene over a broader temperature range by carbon monoxide molecules can best be shown by the following tables. The catalysts employed in the work reported in tabular form are a high area catalyst (Catalyst A) and a low area catalyst (Catalyst B) prepared by the following procedure.

*Catalyst A*

The carrier employed in the preparation of this catalyst is an active alumina sold as KA–101. It is a spherical, extremely adsorbent, chemically inert alumina manufactured by carefully controlled calcination of beta trihydrate. The alumina, employed in the form of 4 to 8 mesh spheres, has a surface area of 360 square meters per gram, a bulk density of 45 lbs. per cu. ft. and a crush strength of 66 pounds. A typical analysis is: 92.5% $Al_2O_3$; 0.4% $Na_2O$; 0.02% $SiO_2$; 0.02% $Fe_2O_3$; 0.002% $TiO_2$; and 7% volatile matter (loss on ignition).

In the preparation of the catalyst, 100 pounds of carrier are used and the amount of water required to just cover the alumina is determined. To this pre-determined quantity of water $PdCl_2$ is added in an amount sufficient to furnish .05 pound of Pd (.083 lb.). The carrier is then immersed in the $PdCl_2$ solution and allowed to stand while the palladium precipitates on the carrier, i.e. until the solution turns clear, about thirty minutes. The water is then drained off, the catalyst is dried at 250° F., and calcined at 900° F., the surface area remaining 360 sq. m./gm.

*Catalyst B*

The alumina carrier described in connection with Catalyst A is dipped in a dilute solution of nickel nitrate until 3 percent nickel is put on the carrier. The resulting catalyst is then dried, and calcined at 2400° F. to 2600° F. to reduce the surface area from 360 sq. m./gm. to about 25 sq. m./gm. The calcined catalyst on a 100 pound basis is then impregnated with palladium and calcined at 900° F. by the same procedure set forth for Catalyst A.

The degree of removal of acetylene using various carbon monoxide quantities in the gases is best shown by acetylene leakage. Hydrogen leakage is also important since it indicates either reaction with ethylene as well as with acetylene or little reaction with either.

TABLE I.—CATALYST A

Operating Conditions:
  Inlet temperature _____ 90° F. to 315° F.
  Operating Pressure, p.s.i.g. _____ 300.
  Design Space Velocity, v./v./hr. _____ 2,000 to 4,000.
  Hydrogen/Acetylene ratio _____ Given in table.
  Carbon Monoxide, p.p.m. _____ Do.

Gas Composition: Volume, Percent
  Ethylene _____ 70
  Acetylene _____ 1
  Hydrogen _____ 2
  Inerts _____ 27

| CO, p.p.m. | $H_2/C_2H_2$ | Temp., °F. | SV | $C_2H_2$ Out, p.p.m. | $H_2$ Out, p.p.m. |
|---|---|---|---|---|---|
| 0 | 2/1 | 90 | 2,000 | 8,900 | 1,190 |
| 0 | 2/1 | 105 | 2,000 | 1,412 | 690 |
| 0 | 2/1 | 315 | 2,000 | 416 | 0 |
| 9.5 | 2/1 | 226–260 | 4,000 | 267–273 | 21–5 |
| 9.5 | 2/1 | 210–213 | 2,000 | 51 | 0 |
| 11 | 2.21/1 | 233–269 | 4,000 | 12–23 | 25–22 |
| 20 | 2.1/1 | 235–315 | 4,000 | 176–606 | 85–0 |
| 20 | 2.1/1 | 212 | 2,000 | 200–234 | 78–87 |
| 20 | 4.4/1 | 240–290 | 4,000 | 0–3 | 44.0 |
| 20 | 4.4/1 | 212 | 2,000 | 8 | 113–120 |
| 33 | 1.73/1 | 228–235 | 4,000 | 1–2 | 15–20 |
| 72 | 3.05/1 | 265–305 | 4,000 | 0–1 | 0–35 |
| 98 | 2/1 | 290–315 | 4,000 | 0–5 | 68–0 |

TABLE II.—CATALYST B

Operating Conditions:
  Inlet temperature _____ 90° F. to 315° F.
  Operating Pressure, p.s.i.g. _____ 300.
  Design Space Velocity, v./v./hr. _____ 2,000 to 4,000.
  Hydrogen/Acetylene ratio _____ Given in table.
  Carbon Monoxide, p.p.m. _____ Do.

Gas Composition: Volume, Percent
  Ethylene _____ 70
  Acetylene _____ 1
  Hydrogen _____ 2
  Inerts _____ 27

| CO, p.p.m. | $H_2/C_2H_2$ | Temp., °F. | SV | $C_2H_2$ Out, p.p.m. | $H_2$ Out, p.p.m. |
|---|---|---|---|---|---|
| 0 | 2/1 | 120–175 | 4,000 | 0–25 | 300–50 |
| 0 | 2/1 | 95–125 | 2,000 | 0–1 | 360–300 |
| 0 | 2.76/1 | 145–224 | 4,000 | 10–31 | 487–0 |
| 0 | 2.76/1 | 111–160 | 2,000 | 0–1 | 235–5 |
| 0 | 4.25/1 | 158–230 | 4,000 | 0–3 | 84–0 |
| 10 | 2/1 | 135–182 | 4,000 | 0–5 | 1,610–0 |
| 10 | 2/1 | 120–212 | 2,000 | 0–6 | 3,150–0 |
| 8 | 2/1 | 126–210 | 4,000 | 0–1 | 1,885–20 |
| 83 | 2/1 | 175–350 | 4,000 | 0 | 2,570–0 |
| 387 | 2/1 | 235–345 | 4,000 | 0 | 5,050–57 |

The foregoing tables demonstrate that high surface area Catalyst A, having poor selectivity, performs with outstanding selectivity when 9 to 98 parts per million carbon monoxide are present. The tables also show that low surface area Catalyst B, an excellent selective hydrogenation catalyst, is nevertheless improved by the use of this invention. It has been found with Catalyst B, however, that the larger quantities of carbon monoxide within the 5 to 400 parts per million range are even more effective. There is also a relationship between the temperature and space velocity on the one hand, and the catalyst surface area on the other. It is thus preferred to use temperatures, space velocities and carbon monoxide values in the upper half of the range with catalysts with surface areas of 100 to 1 square meters per gram and in the lower half of the ranges with catalysts whose surface areas are 400 to 150 square meters per gram.

In addition to the fact that it permits use of high surface area catalysts, not usable hereinbefore, this invention also provides a process wherein the temperature is less critical. Whereas it has been necessary heretofore to watch the temperature closely, this invention permits the hydrogenation to be carried out over a wider temperature range for each set of conditions. This, of course, makes the process more attractive industrially. This aspect of the invention is illustrated by the curves in the accompanying drawing in which Catalyst B is used in obtaining the data of FIGS. 1, 2, and 3.

FIG. 1 shows the effect of a variety of carbon monoxide levels on temperature (abscissa) acetylene leakage (ordinate) at constant space velocity.

In FIGS. 2 and 3 are similarly plotted curves showing the effect of space velocity.

Figure 4:
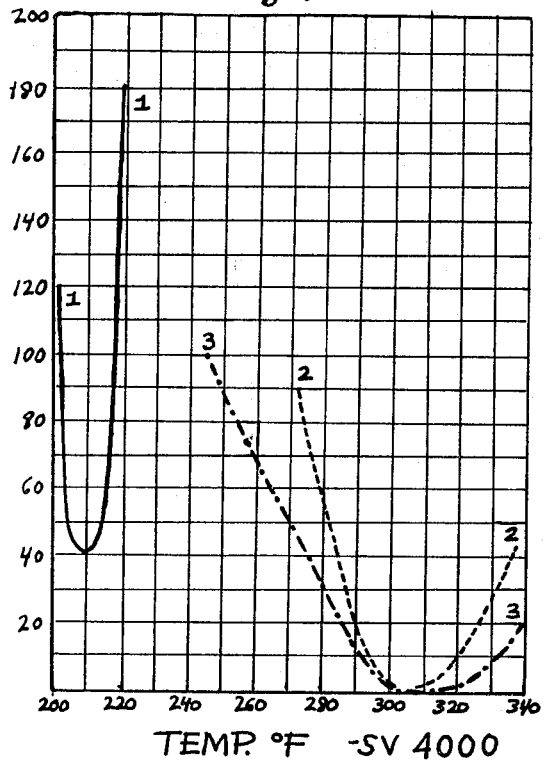

FIG. 4 shows carbon monoxide levels, acetylene leakages and temperatures using Catalyst A.

FIG. 1 shows that when more than 8 parts per million carbon monoxide are present (curves 3 and 4) virtually any temperature range above about 150° F. can be employed. Without carbon monoxide this is not true (curve 1). The catalyst is Catalyst B.

FIG. 2 shows that at a space velocity of 4000 the hydrogenation would be operated at 148° F. for optimum results (curve 1). This is compared with the range permitted by 10 parts per million carbon monoxide (curve 2). A similar, but less pronounced, comparison is illustrated in FIG. 3 for a 2000 space velocity.

FIG. 4 shows that high surface area Catalyst A can be readily employed in this selective hydrogenation at 280° F. to 340° F. In addition at lower temperatures even an amount of 10 parts per million carbon monoxide is effective. The prior art teaches that a catalyst such as Catalyst A is not useable for this purpose.

This invention thus provides for the production of polymer-grade ethylene in a single hydrogenation step. It also provides an excellent tail gas clean up process because of low acetylene leakage and latitude of operating conditions. In addition, leakage shows that small amounts of hydrogen are consumed during the hydrogenation, indicating minimal ethylene hydrogenation. The process of this invention affords protection against run-away temperatures and gives exceedingly long operating cycles. The tables and drawings show various embodiments of the invention. Other ramifications and variations will occur to those skilled in the art, and such obvious modifications are deemed to be within the scope of this invention.

What is claimed is:

1. In the process for separating acetylene from a gas stream containing both acetylene and ethylene by selective hydrogenation wherein at a given space velocity in the range of 500 to 7000 volumes of gas per volume of catalyst per hour and using a catalyst containing 0.01 to 0.1 weight percent palladium supported on alumina, and wherein a narrow hydrogenation temperature range $\Delta T$ must be maintained in the region of $100°F.\leqslant \Delta T\leqslant 400°F.$ for maximum selectivity, the step of broadening the $\Delta T$ range consisting essentially of maintaining carbon monoxide in said gas stream in an amount of 5 to 400 parts per million based on the gas stream during the hydrogenation.

2. The process according to claim 1 wherein the gas stream is a tail gas stream of ethylene containing 10 to 100 parts per million acetylene as obtained from the fractionation of a primarily $C_2$ stream derived from the cracking of low molecular weight hydrocarbons, wherein the temperature is in the range of 100° F. to 250° F., wherein the space velocity is in the range of 1000 to 6000 volumes of gas per volume of catalyst per hour, and wherein the catalyst contains 0.01 to 0.05 weight percent palladium.

3. A process according to claim 2 wherein the palladium catalyst has a surface area of 1 to 100 square meters per gram and wherein the temperature, space velocity and carbon monoxide values are within the upper half of said ranges.

4. A process according to claim 2 wherein the palladium catalyst has a surface area of 150 to 400 square meters per gram and wherein the temperature, space velocity and carbon monoxide values are within the lower half of said ranges.

5. The process according to claim 1 wherein the gas stream contains 1.15 to 5 mols hydrogen per mol of acetylene.

References Cited by the Examiner

UNITED STATES PATENTS

| | | | |
|---|---|---|---|
| 2,378,969 | 6/1945 | Bailey et al. | 260—677 |
| 2,946,829 | 7/1960 | Likins et al. | 260—677 |
| 3,084,023 | 2/1963 | Anderson et al. | 260—677 |

FOREIGN PATENTS

| | | |
|---|---|---|
| 606,433 | 10/1960 | Canada. |
| 1,236,329 | 7/1960 | France. |
| 835,689 | 5/1960 | Great Britain. |

OTHER REFERENCES

Chem. Eng. Progress 54, No. 12, pages 48 to 50.

ALPHONSO D. SULLIVAN, *Primary Examiner.*